United States Patent [19]
Durling

[11] 4,204,555
[45] May 27, 1980

[54] EXHAUST VALVE ASSEMBLY

[75] Inventor: Harold Durling, Elsie, Mich.

[73] Assignee: Midland-Ross Corporation, Cleveland, Ohio

[21] Appl. No.: 914,899

[22] Filed: Jun. 12, 1978

[51] Int. Cl.² .............................................. F16K 11/00
[52] U.S. Cl. .................................... 137/102; 137/854
[58] Field of Search ............. 137/102, 103, 107, 843, 137/854; 128/142.2, 145.5, 145.7

[56] References Cited
U.S. PATENT DOCUMENTS

| | | |
|---|---|---|
| 344,862 | 7/1886 | Richardson . |
| 714,747 | 12/1902 | Rowley . |
| 967,514 | 8/1910 | Groh . |
| 1,070,803 | 8/1913 | Harkom . |
| 2,936,779 | 5/1960 | Kindred . |
| 2,992,808 | 7/1961 | Burritt . |
| 3,034,761 | 5/1962 | Janquart . |
| 3,342,200 | 9/1967 | Wilcox . |
| 3,356,100 | 12/1967 | Seeler ................................. 137/102 |
| 3,403,696 | 10/1968 | Pynchon . |
| 3,424,185 | 1/1969 | Lansky ................................. 137/102 |
| 3,460,558 | 8/1969 | Johannisson ........................ 137/102 |

*Primary Examiner*—Robert G. Nilson
*Attorney, Agent, or Firm*—H. Duane Switzer

[57] ABSTRACT

An exhaust valve assembly includes a housing having a plurality of ports and a flexible diaphragm movable between opposite positions for selectively connecting the ports. A central elongated stem on the diaphragm extends tightly through a hole in the housing for minimizing vibration of the diaphragm.

5 Claims, 6 Drawing Figures

EXHAUST VALVE ASSEMBLY

BACKGROUND OF THE INVENTION

This application relates to the art of valves and, more particularly, to valves used in vehicle air brake systems. The invention is particularly applicable to an exhaust valve assembly and will be particularly described with reference thereto. However, it will be appreciated that the invention has broader aspects and may be used in other valve assemblies.

A known type of exhaust valve assembly used on vehicle air brake systems includes a housing having supply, delivery and exhaust ports. A flexible diaphragm is positioned in the housing between the exhaust and supply ports for closing the exhaust port when air pressure is supplied to the supply port for delivery past the diaphragm to the delivery port. When air pressure is supplied to the delivery port in the absence of air pressure at the supply port, the diaphragm moves away from the exhaust port and closes the supply port so that air flows from the delivery port through the exhaust port.

Operation of an exhaust valve in the manner described frequently results in very high frequency vibration of the diaphragm which produces a very loud noise. This vibration and loud noise is commonly referred to as "horning". The vibration of the diaphragm also tends to reduce the air flow rate through the exhaust port.

It would be desirable to have an exhaust valve assembly of the type described wherein vibration of the diaphragm was minimized.

SUMMARY OF THE INVENTION

An exhaust valve assembly includes a housing having supply, delivery and exhaust ports. A flexible diaphragm positioned between the supply and exhaust ports closes the exhaust port when air pressure is supplied to the supply port for delivery past the diaphragm to the delivery port. In the absence of air pressure at the supply port, air pressure at the delivery port causes the diaphragm to move away from the exhaust port and close the supply port so that air flows from the delivery port through the exhaust port. An elongated central stem on the diaphragm extends tightly through a hole in the housing for inhibiting vibration of the diaphragm.

In a preferred arrangement, the elongated stem is substantially cylindrical along its full length and is capable of axial sliding movement relative to the hole through which it extends.

The housing includes a body having the supply and delivery ports therein, and a cover secured to the body has the exhaust port therein. The diaphragm is positioned in a cavity in the body between the cover and the supply port. The distance between the cover and a seat surrounding the supply port is less than the longitudinal length of the cylindrical portion of the stem.

It is a principal object of the present invention to provide an improved exhaust valve assembly which is very quiet in operation.

It is an additional object of the invention to provide an improved exhaust valve assembly having a diaphragm in which vibration is inhibited.

DESCRIPTION OF A PREFERRED EMBODIMENT

Figure 1:
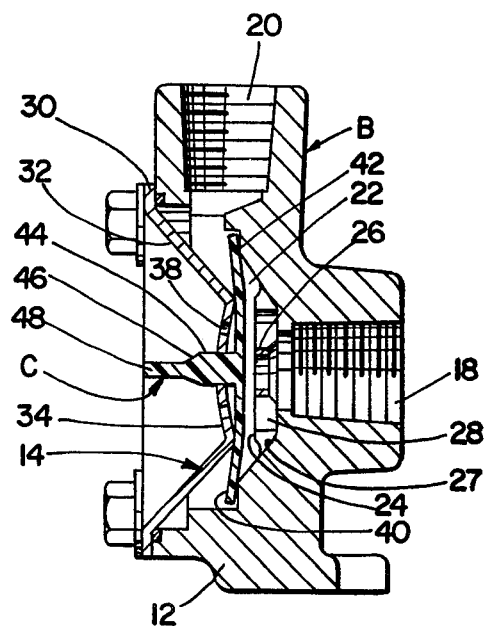
FIG. 1 is a cross-sectional elevational view of an exhaust valve assembly constructed in accordance with the present invention.
Figure 2:
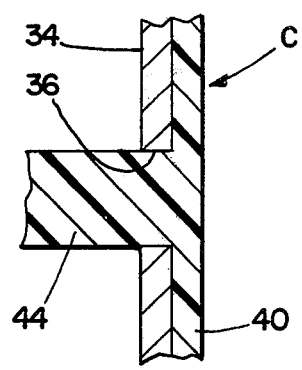
FIG. 2 is a partial enlarged fragmentary view showing a preferred form of a stem on a diaphragm.

With reference to the drawing, FIG. 1 shows an exhaust valve assembly as having a housing B which includes a body 12 and a cooperating cover 14.

Supply and delivery ports 18 and 20 are formed in housing body 12 and extend substantially perpendicular to one another for communicating with a housing cavity 22. Supply port 18 has a circumferential stop surface 24 surrounding same and facing toward cavity 22. Port 18 enters cavity 22 through a central opening in a circular member 26, and through the spaces between a plurality of circumferentially-spaced spokes 28 extending between the housing adjacent stop surface 24 and the circular member 26. Circumferentially-spaced grooves 27 extend across stop surface 24 to provide communication between chamber 22 and port 18 even though diaphragm C may be seated against stop surface 24.

Cover 14 includes a flat peripheral mounting flange 30 having a plurality of holes therein for receiving bolts which extend into suitable tapped holes in the body 12. Cover 14 is dished to include a generally frusto-conical portion 32 extending from flange 30 toward supply port 18. A slightly curved base 34 extends across frusto-conical portion 32 opposite from mounting flange 30. Base 34 includes a centrally located hole 36 and a plurality of circumferentially-spaced openings 38 radially outward therefrom which cooperate to define an exhaust port for exhausting air to atmosphere.

A flexible diaphragm C of rubber or other suitable flexible material includes a flat circular diaphragm base 40 positioned in housing cavity 22 between cover base 34 and supply port 18. A circumferential valve seat 42 in housing cavity 22 supports the outer peripheral portion of diaphragm base 40. The distance axially of port 18 between the periphery of cover base 34 and valve seat 42 is less than the thickness of diaphragm base 40. An integral central cylindrical stem 44 extends from diaphragm base 40 through centrol hole 36 in cover base 34. Hole 36 in cover base 34 preferably lies on a common longitudinal axis with the axis of supply port 18. Stem 44 is a tight fit through hole 36 so it does not readily slide relative thereto. Stem 44 is preferably under slight compression when it is received through hole 36. Stem 44 has a cylindrical portion of uniform diameter from diaphragm base 40 to a frusto-conical portion 46 which slopes inwardly and merges into a much smaller diameter elongated pull finger 48 which aids in pulling stem 44 through hole 36 in cover base 34.

Figure 3:
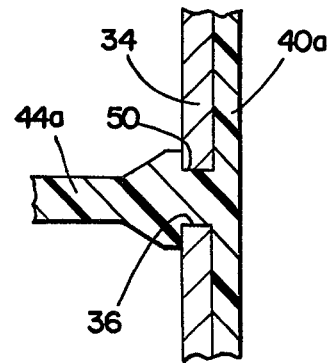
FIG. 3 is an enlarged fragmentary view similar to FIG. 2 and showing a modified form of stem on a diaphragm.
Figure 4:
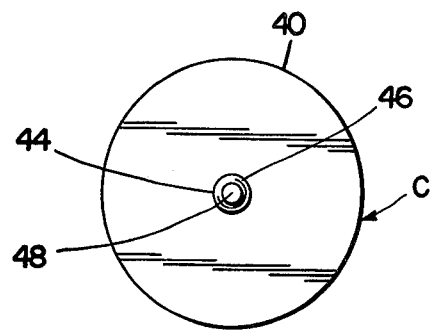
FIG. 4 is a plan view of a diaphragm.
Figure 5:
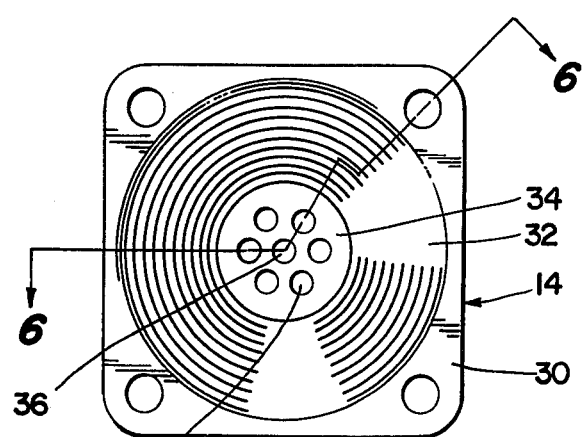
FIG. 5 is a plan view of a housing cover used in the valve assembly of FIG. 1.
Figure 6:
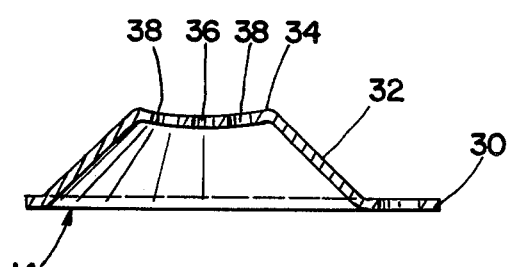
FIG. 6 is a cross-sectional elevational view taken generally on line 6—6 of FIG. 5.

FIG. 3 shows a modified arrangement wherein a diaphragm stem 44a extending centrally from a diaphragm base 40a has a circumferential groove 50 therein directly adjacent base 40a for tightly receiving the peripheral portion of cover base 34 around hole 36. This prevents movement of stem 44a relative to hole 36.

With reference to FIG. 1, the distance between cover base 34 and stop surface 24 is less than the length of the cylindrical portion of stem 44 from diaphragm base 40 to frusto-conical portion 46. Thus, the cylindrical portion of stem 44 is never displaced from hole 36 during operation of the valve.

The valve assembly is installed in a vehicle air brake system by connecting a source of air pressure with supply port 18 through a suitable control valve. Delivery port 20 is connected with the air chamber of a brake motor or with the air chamber of a parking brake. When air pressure is supplied to supply port 18, diaphragm base 40 is firmly pressed against cover base 34 and closes the exhaust port defined by openings 38. At the same time, the outer peripheral portion of diaphragm base 40 bends away from valve seat 42 for allowing air flow therepast from supply port 18 to delivery port 20. When air pressure is exhausted from supply port 18 of the exhaust valve, pressure from delivery port 20 acts against the opposite side of diaphragm base 40 to urge same against valve seat 42 and close supply port 18. Circular ring 26, spokes 28 and stop surface 24 support the central area of diaphragm base 40 in this position. This allows air from delivery port 20 to flow past diaphragm base 40 through the exhaust port defined by openings 38 in cover base 34. In some cases, it is possible that stem 44 will not move relative to cover base 34 or will not move far enough to completely seat diaphragm base 40 on circular ring 26 and spokes 28. However, operation of the valve is still the same because diaphragm base 40 can flex away from cover base 34 to allow air flow therepast through exhaust port 38, while also engaging valve seat 42. This is how the embodiment of FIG. 3 operates because stem 44a cannot move relative to cover base 34. Diaphragm base 40a curves and twists away from cover base 34 but remains in engagement with valve seat 42.

Base 40 of diaphragm C may be considered to have an outer area of deflection located generally between the outer periphery of cover base 34 and valve seat 42. This outer area deflects away from seat 42 when pressure is supplied to port 18, and deflects back into engagement with seat 42 when pressure is removed from port 18. Diaphragm base 40 may be considered as having an inner area of deflection located generally within the outer periphery of cover base 34. This inner area of deflection will deflect in different ways depending upon how snug stem 44 is received through hole 36 in cover base 34, and depending upon whether or not the stem has groove 50 for locking same in hole 36.

When pressure is supplied to port 18, diaphragm base 40 is deformed against dished cover base 34 to close exhaust ports 38. At the same time, the outer area of diaphragm base 40 deflects away from seat 42 to establish communication between supply port 18 and delivery port 20. This may be considered a first mode for diaphragm C. When pressure is removed from port 18, the pressure acting at delivery port 20 firmly engages the outer area of diaphragm base 40 with seat 42 and deflects the inner area of diaphragm base 40 away from cover base 34 for exhausting the pressure at port 20 through ports 38. Where stem 44 can move relative to cover base 34, diaphragm base 40 will move into engagement with stop surface 24, spokes 28 and ring 26. Where the stem has a groove as in the embodiment of FIG. 3, the diaphragm base may or may not engage all of stop surface 24, spokes 28 or ring 26.

It will be recognized that stem 44, 44a could extend from the opposite side of diaphragm base 40 through a hole in the housing adjacent supply port 18. In addition, it is possible to locate stem 44, 44a other than centrally, and to have more than one such stem. The important consideration is the provision of cooperating dampening means between the diaphragm and valve housing in the previously defined inner area of deflection for the diaphragm so that free movement of the diaphragm is inhibited to prevent horning of same.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. An exhaust valve assembly comprising: a housing including a body having a cavity, supply and delivery ports in said body extending substantially perpendicular to one another in communication with said cavity, said housing including a cover secured to said body over said cavity opposite said supply port, a hole in said cover in axial alignment with said supply port, a plurality of openings through said cover outwardly of said hole and defining an exhaust port for said valve, a flexible diaphragm positioned in said cavity between said cover and supply port and having a central integral stem extending through said hole in firm engagement therewith for inhibiting movement of said diaphragm toward and away from said exhaust port and thereby inhibiting horning of said diaphragm, said diaphragm being operative in response to air pressure at said supply port to close said exhaust port and provide communication between said supply and delivery ports, and said diaphragm being responsive to air pressure at said delivery port in the absence of air pressure at said supply port to close said supply port and provide communication between said delivery and exhaust ports.

2. The valve assembly of claim 1 including a circumferential groove in said stem receiving the periphery of said housing around said hole.

3. The valve assembly of claim 1 wherein said stem is substantially cylindrical along its length and is a tight fit through said hole.

4. The valve assembly of claim 1 wherein said cover is dished and extends into said cavity toward said supply port, said supply port having a seat therearound, and the distance between said cover and seat being less than the cylindrical length of said stem.

5. A valve assembly comprising: a housing having a plurality of ports, a flexible diaphragm in said housing movable between opposite positions for selectively providing flow between certain of said ports, said diaphragm having a central cylindrical stem tightly received through a hole in said housing for inhibiting vibration of said diaphragm while providing longitudinal movement of said stem relative to said hole, said housing having opposite surfaces defining the limits of said opposite positions of said diaphragm, said stem having a length greater than the distance between said opposite surfaces, said stem having an elongated integral small diameter pull finger on the outer end thereof, and an inwardly sloping surface between said stem and finger.

* * * * *